Nov. 2, 1948.    R. M. PAGE    2,452,598
MULTIPLE RANGE INDICATOR
Filed Jan. 6, 1942    2 Sheets-Sheet 1
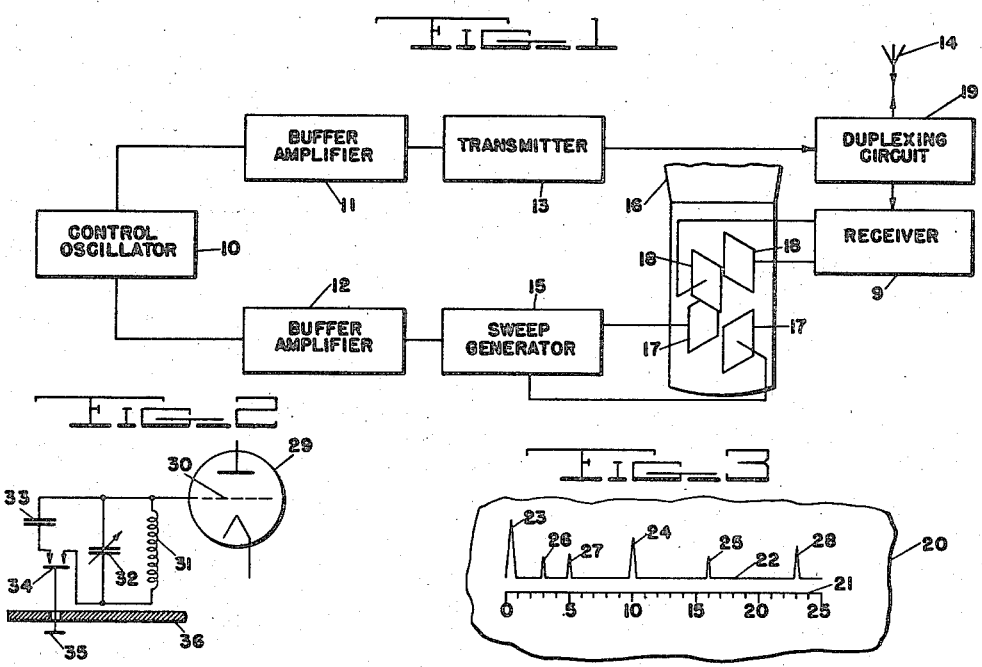
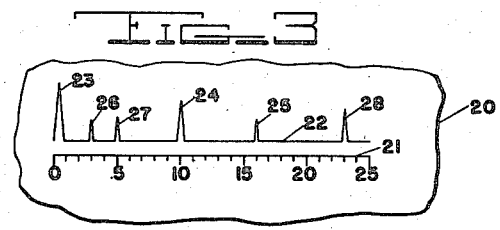
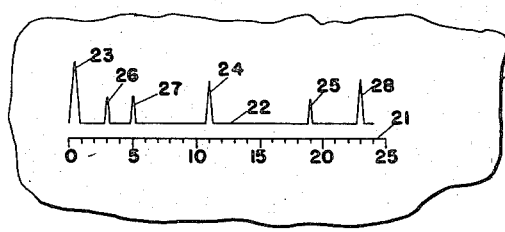
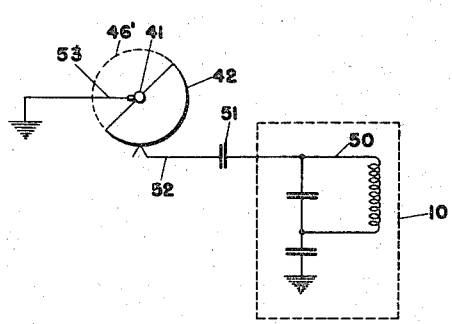
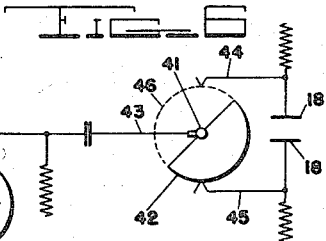
INVENTOR
Robert M. Page
BY
ATTORNEY

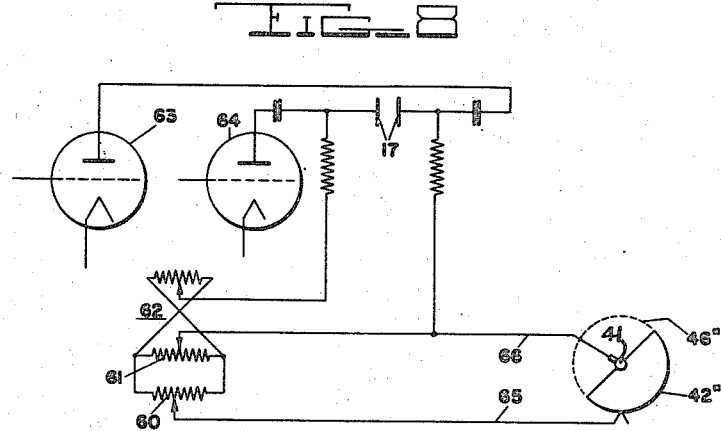
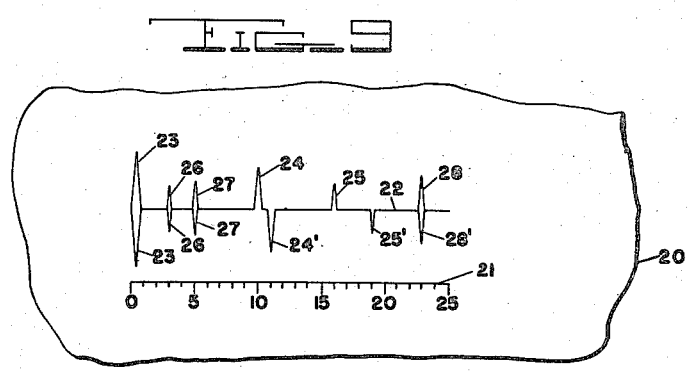
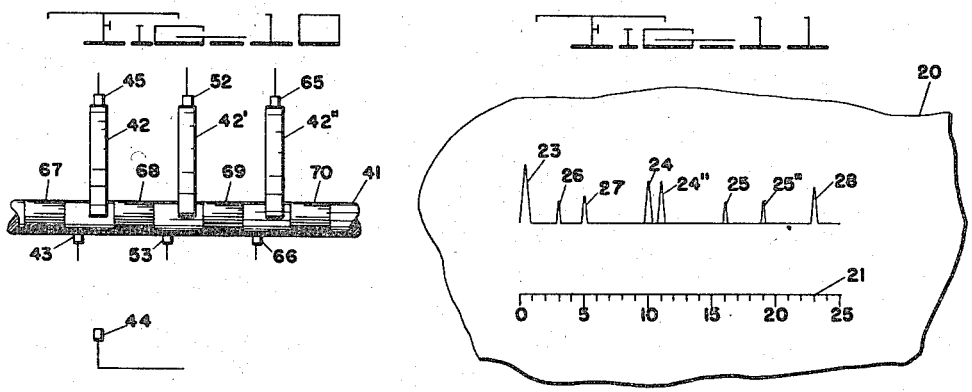

Patented Nov. 2, 1948

2,452,598

UNITED STATES PATENT OFFICE 2,452,598

MULTIPLE RANGE INDICATOR

Robert M. Page, Washington, D. C.

Application January 6, 1942, Serial No. 425,719

11 Claims. (Cl. 343—13)

(Granted under the act of March 3, 1883, as amended April 30, 1928; 370 O. G. 757)

This invention relates to a radio echo ranging device and more particularly to a method and means for reliably indicating ranges of objects in a manner to readily establish the truth or falsity of such indications.

Radio echo ranging devices operate by the propagation of a regular series of very short pulses of radio frequency energy, reflections of which from objects within the range of the device are received and caused to produce an indication of the distance of the object from the device. This is accomplished by synchronizing the transmitted pulses with a recurring time trace applied along one coordinate on the screen of a cathode ray tube in such a manner that each sweep of the time trace is initiated at the same instant that a pulse is transmitted. The transmitted pulse and any echoes of it which may be received are applied to the deflection plates of the cathode ray tube in a manner to cause movement of the cathode ray beam along another coordinate, thus producing a visible deviation of the time trace. The deviation caused by the transmission of the pulse is located at the origin of the trace and the position along the trace of each deviation due to an echo is an indication of the distance of the reflecting object from the device.

In such devices the time between pulses is chosen to equal the time of travel of a pulse to an object at the maximum desired range and return. This range is limited by the curvature of the earth and the elevation of the device and by the length of time trace which is feasible at a calibration which will give a desired degree of accuracy.

In most conditions of use it is possible and often likely that reflections may be had from objects beyond the maximum range for which the device is calibrated. For example distant mountain ranges or planes may cause indications. Such indications will not be truly shown on the cathode ray tube but would appear to come from objects lying within the calibrated range of the device. For example if the maximum range of the device be 25 miles a reflection from an object 30 miles distant will appear to come from an object 5 miles distant.

It is an object of this invention to provide a method and means for distinguishing between such correct and erroneous indications. It is another object of this invention to provide a manually operable means for distinguishing between correct and erroneous indications of distance. It is a further object of this invention to provide an automatic and continuously operable means for distinguishing between correct and erroneous indications of distance. It is a still further object of this invention to provide in a radio echo ranging system a means for changing the maximum calibrated range of the system at will. It is another object of this invention to provide means for altering at will the pulse rate of a radio echo ranging system. Other objects will become apparent from a consideration of the following description when taken together with the accompanying drawings in which:

Fig. 1 is a block diagrammatic showing of a radio echo ranging system;

Fig. 2 is a fragmentary circuit diagram illustrating one embodiment of the invention;

Fig. 3 is a plan view of a fragment of the viewing screen of a cathode ray tube showing a scale and a time trace related thereto and bearing deviations indicating the reception of echoes;

Fig. 4 is a view similar to that of Fig. 3 showing the results of shifting the pulse frequency of the system in accordance with the invention;

Fig. 5 is a fragmentary circuit diagram illustrating the normal manner of impressing the receiver output upon the deflecting plates of the oscillograph;

Fig. 6 is a view similar to that of Fig. 5 showing the manner of incorporating the receiver output inverting mechanism of the invention in the circuit of that figure;

Fig. 7 is a fragmentary circuit diagram showing means for changing the frequency of the control oscillator in synchronism with the inversion of the receiver output;

Fig. 8 is a fragmentary circuit diagram showing means for adjusting the position of the time trace with respect to the scale on the viewing screen;

Fig. 9 is a plan view of a portion of the viewing screen of the oscillograph showing the effect on the echo indications of the practice of one form of the invention;

Fig. 10 is a plan view of a fragment of the system showing three switches mounted on a single shaft, and Fig. 11 is a view similar to that of Fig. 9 showing the appearance of the indications on the viewing screen of the oscillograph during one mode of operation.

A known type of echo ranging apparatus is shown in Fig. 1. It comprises a control oscillator 10, the output of which goes to a pair of buffer amplifiers 11 and 12. The oscillator 10 through amplifier 11 controls the self-keying transmitter 13 which transmits pulses at regular intervals to antenna 14. The oscillator 10 also, through amplifier 12, controls the sweep generator 15, the output of which is applied to the deflection plates 17 of cathode ray tube 16 thus producing a recurring time trace on the screen of the tube, which trace is synchronized with the pulse transmission. A receiver 19 is excited from antenna 14 and has its output applied to the remaining pair of deflection plates 18 of cathode ray tube 16. A duplexing circuit 9 is employed enabling the single antenna 14 to be used both for transmitting and receiving.

In Fig. 3 is shown a fragment 20 of the viewing screen of a cathode ray tube such as 16. Inscribed on the face of the screen is a scale 21 and shown parallel thereto is a time trace 22 extending along one coordinate and bearing various echo indications extending unilaterally of the time trace along a coordinate at right angles to the trace. At the extreme left hand end of the trace is the indication 23 caused by the transmission of the pulses. Scattered along the trace are other indications which are caused by echoes from objects in the vicinity, one opposite the 10-mile division of the scale being marked 24 and one marked 25 occurring opposite the 16-mile point of the scale. Others marked 26, 27 and 28 appear opposite the 3-mile, 5-mile and 23-mile points of the scale respectively.

Thus from looking at the viewing screen one would assume the presence of objects at distances of 3, 5, 10, 16 and 25 miles from the ranging apparatus. However, any one of these indications may be erroneous. For example, the 3-mile indication might be a reflection from an object distant 28 miles and so on.

By utilizing the invention the character of the indication can be rendered immediately apparent. This may be accomplished by changing the frequency of the pulse transmission or in other words changing the time interval between pulses. Fig. 4 illustrates the results of following this procedure. The time trace as shown in Fig. 4 has been reduced from 25 to 24 miles. This change has of course been accompanied by a reduction in the time interval between pulses so that the time interval is just sufficient to allow energy from a pulse to travel a distance of 24 miles and return. It will be noted in Fig. 4 that all the indications remain the same except those numbered 24 and 25. The indication 24 which formerly appeared at 10 miles now appears at 11. That numbered 25 which formerly appeared at 16 miles now appears at 19. It is now obvious that the object producing the reflection causing the indication 24 is not distant 10 miles but is distant 35 miles and the object producing the indication 25 is not distant 16 miles but is 91 miles away.

A simple and effective means for achieving this result is illustrated in Fig. 2. This figure shows a portion of the control oscillator 10 comprising the oscillating tube 29 having a control electrode 30, the frequency of the tube being controlled by a tuned circuit made up of inductance 31 and variable condenser 32. Shunted across the condenser 32 is another condenser 33. This condenser may be cut in or out of the circuit at will by means of a switch 34 controlled by a push button 35 from the instrument panel 36 of the device.

A second embodiment of the invention is illustrated in Figs. 5 to 9 inclusive. In utilizing this embodiment the desired results are achieved by inverting the receiver output at regular intervals of time so that indications occur both above and below the time trace. This action is accompanied by synchronized changes in the control oscillator frequency so that each time the output is inverted the frequency simultaneously changes by a predetermined amount. Thus the indications appearing above the line will be made at one pulse frequency and those below the line at another. This results in a shift of the location of erroneous indications just as was secured by use of the first embodiment.

In Fig. 5 is shown the final tube 40 of receiver 19, the output of which is being applied to one of the deflection plates. In Fig. 6 the output of the receiver has been passed through a rotary switch 46 comprising a shaft 41 and a 180° contact member 42 secured for rotation with shaft 41. The output of the receiver is applied to the shaft 41 by means of contact 43 riding on shaft 41. A pair of resilient contact members 44 and 45 are each connected to one of the plates 18 and are positioned 180° apart in the path of the contact member 42. The switch 46 is rotated at a constant speed with the result that the output of the receiver is alternately applied to each of plates 18 at regular intervals.

Fig. 7 shows a means for changing the pulse frequency in synchronism with the inversion of the receiver output. The control oscillator 10 is shown provided with a tuned circuit 50 which controls its frequency and also with a condenser 51 adapted to be shunted across this circuit through switch 46'. This is accomplished by contacts 52 and 53. Contact 52 is positioned in the path of the 180° contact member 42' and contact 53 rides on the shaft 41.

The shortening of the time trace caused by the change in control oscillator frequency occurs about the central point of the trace. This would result in indications being displaced with respect to the scale whether or not they are true indications. This difficulty can be easily overcome in use of the first embodiment by manually shifting the time trace until the indication caused by the transmission of the pulses lies opposite the zero point of the scale. This can be accomplished by the usual adjusting knob provided for this purpose. However, when the automatic means of the second embodiment is employed such manual adjustment cannot be effected. It can, however, be accomplished by the automatic means shown in Fig. 8. This means employs the switch 46'' which simultaneously with each receiver output inversion and oscillator frequency change from normal changes the average bias potential of one of the plates 17 of the oscillograph. The direction and amount of this change is controlled by potentiometer 60, which is adjustable at the panel independently of dual potentiometer 62, which, without 60, is the usual means for adjusting the centering of the time trace. Potentiometer 60 is shown connected to the right plate 17 in the figure. The plates 17 are shown connected to tubes 63 and 64 of the sweep generator 15. The potentiometer 60 is so adjusted as to automatically shift the time trace each time the receiver output is inverted, and the switch 46'' simultaneously closed, by an amount such that the left hand end of the time trace remains opposite the zero mark of the scale.

Fig. 9 shows the appearance of the indications on the time trace resulting from the employment of this embodiment of the invention. It should be noted that the indications 23, 26, 27, 28 remain unchanged in position when inverted, the indications 24 and 25 being shifted as shown at 24' and 25' in the same manner as in Fig. 4.

Fig. 10 shows the manner of mounting switches 46, 46' and 46''. As shown in that figure they are preferably mounted on the single shaft 41, each of the contact members 42, 42' and 42'' being mounted on a segment of the shaft which is insulated from the remainder of the shaft. Insulation segments are shown at 67, 68, 69 and 70. The contacts 43, 53 and 66 are shown in contact with the segments of the shaft upon which are mounted semi-cylindrical contact members 42, 42' and 42'' respectively.

The automatic frequency changing mechanism of Fig. 7 and the centering mechanism of Fig. 8 may be used without inversion of the receiver output, if desired. By slowing the speed of the rotating switch the eye can follow the shift of spurious indications. The same result can be accomplished by alternately starting and stopping the shaft 41 bearing the rotary switches 46, 46' and 46'' at a speed such that the shift can be seen. Multiple range echoes can also be identified without inversion and without slowing down the speed of the rotating switch since they will appear paired, each indication at one half intensity and with its base line filled in, as shown in Fig. 11. The result in the presence of many echoes would be confusing however.

It will thus be noted that the invention affords a method and means for either manually or automatically determining the true character of the range indications of an echo ranging device. The automatic means affords instantaneous and continuous information as to the character of the received indications without requiring any attention from the operator.

The invention described herein may be manufactured and used by or for the Government of the United States of America for governmental purposes without the payment of any royalties thereon or therefor.

I claim:

1. A radio pulse echo system comprising means for transmitting a regular series of pulses, means for receiving the reflections of said pulses from reflecting objects, a cathode ray tube, means forming on the viewing screen of said tube a recurring time trace synchronized with said pulse transmission, means forming on said time trace indications of the reception of said reflections, a scale in juxtaposition to said time trace and having its zero mark opposite the point of origin thereof, means for changing the frequency of said pulse transmission and means for maintaining the point of origin of said time trace opposite the zero mark of said scale, the rate of movement of said time trace remaining constant.

2. A radio pulse echo system comprising means for transmitting a regular series of pulses, means for receiving the reflections of said pulses from reflecting objects, a cathode ray tube, means forming on the viewing screen of said tube a recurring time trace synchronized with said pulse transmission, means forming on said time trace indications of the reception of said reflections, a scale in juxtaposition to said time trace and having its zero mark opposite the high point of origin thereof, and means for changing the frequency of said pulse transmission, the rate of movement of said time trace remaining constant.

3. A radio pulse echo system comprising means for transmitting a regular series of pulses, means for receiving the reflections of said pulses from reflecting objects, a cathode ray tube, means forming on the viewing screen of said tube a recurring time trace synchronized with said pulse transmission, said time trace having its origin located in a predetermined position on said viewing screen, means forming on said time trace indications of the reception of said reflections, means for changing the frequency of said pulse transmission while maintaining said time trace in synchronism with said transmission and means for maintaining the origin of said time trace in the same position as before, the rate of movement of said time trace remaining constant.

4. A radio pulse echo system including in combination means for transmitting a regular series of pulses, an indicator, means for receiving said pulses after reflection from wave reflecting objects and for applying said received pulses to produce indications on said indicator, along a locus having its point of origin at a predetermined position on said indicator, the distances of the indications of said received pulses from said point of origin being a measure of the distance of said reflecting objects from said transmission means, and means for varying the interval between transmission of said pulses and simultaneously varying the length of said locus by a proportionate amount, while maintaining unchanged the location of the indication of every reflection received during the pulse interval immediately following transmission of the pulse which initiated it.

5. A radio pulse echo system comprising a control oscillator, a pulse transmitter governed thereby for the transmission of a regular series of radio frequency pulses, a cathode ray tube, a sweep generator governed by said control oscillator and arranged to impress a recurring time trace along one coordinate on the viewing screen of said tube in synchronism with said pulse transmission, a receiver for receiving said transmitted pulses and reflections of said pulses from reflecting objects, means to impress the output of said receiver upon said tube in a manner to cause said time trace to deviate unilaterally with respect to said time trace along another coordinate upon the reception of one of said pulses or a reflection thereof, means for periodically changing the frequency of said oscillator by a predetermined amount, means to simultaneously invert the output of said receiver applied to said tube and means to simultaneously adjust the position of said time trace to maintain constant the position of its point of origin.

6. A radio pulse echo system comprising a control oscillator, a pulse transmitter governed thereby for the transmission of a regular series of radio frequency pulses, a cathode ray tube, a sweep generator governed by said control oscillator and arranged to impress a recurring time trace along one coordinate on the viewing screen of said tube in synchronism with said pulse transmission, a receiver for receiving said transmitted pulses and reflections of said pulses from reflecting objects, means to impress the output of said receiver upon said tube in a manner to cause said time trace to deviate unilaterally with respect to said time trace along another coordinate upon the reception of one of said pulses or a reflection thereof, and a common switching means periodically and simultaneously changing the frequency of said control oscillator by a predetermined amount, inverting the output of said receiver applied to said tube, and adjusting the position of said time trace to maintain stationary its point of origin.

7. In a radio pulse echo system the method of distinguishing between true and erroneous indications of distance which comprises transmitting pulses at a predetermined rate, receiving said pulses after reflection, generating a time trace synchronized with said pulse transmission, applying said received pulses to said time trace to cause deviations therein which act as indications of the distance of the objects reflecting said pulses, and simultaneously changing the rate of said pulse transmission and the length of said time trace by proportionate amounts while maintaining constant the rate of generation of said time trace.

8. In a radio pulse echo system the method of distinguishing between true and erroneous indications of distance which comprises transmitting pulses at a predetermined rate, receiving said pulses after reflection, generating a time trace synchronized with said pulse transmission, applying said received pulses to said time trace to cause deviations therein which act as indications of the distance of the objects reflecting said pulses, simultaneously changing the rate of said pulse transmission and the length of said time trace by proportionate amounts while maintaining constant the rate of generation of said time trace, and maintaining in a fixed position the point of origin of said time trace.

9. In a radio pulse echo system the method of distinguishing between true and erroneous indications of distance which comprises transmitting pulses at a predetermined rate, receiving said pulses after reflection, generating a time trace synchronized with said pulse transmission, applying said received pulses to said time trace to cause unilateral deviations therein which act as indications of the distance of the objects reflecting said pulses, periodically and simultaneously changing the rate of said pulse transmission and the length of said time trace in a fixed position and maintaining constant the rate of generation of said time trace.

10. In a radio pulse echo system the method of distinguishing between true and erroneous indications of distance which comprises transmitting pulses at a predetermined rate, receiving said pulses after reflection, generating a time trace synchronized with said pulse transmission, applying said received pulses at said time trace to cause deviations therein which act as indications of the distance of the objects reflecting said pulses, periodically and simultaneously changing the rate of said pulse transmission and the length of said time trace by proportionate amounts, while maintaining the point of origin of said time trace in a fixed position and maintaining constant the rate of generation of said time trace.

11. A pulse echo system including in combination means for transmitting distance indicating pulses, a cathode ray indicator, means for receiving said pulses and for applying said pulses to said indicator to indicate reflected pulses, means for sweeping said ray along a scale to indicate the distances of the reflecting surfaces, and means for maintaining said sweep rate with respect to a unit distance and for changing simultaneously the rate of said pulse transmission and the maximum distance range of said indicator.

ROBERT M. PAGE.

REFERENCES CITED

The following references are of record in the file of this patent:

UNITED STATES PATENTS

| Number | Name | Date |
| --- | --- | --- |
| 1,613,954 | Knoop | Jan. 11, 1927 |
| 1,979,225 | Hart | Oct. 30, 1934 |
| 2,143,035 | Smith | Jan. 10, 1939 |